United States Patent Office 2,981,763
Patented Apr. 25, 1961

2,981,763

MANUFACTURE OF FLUOROCARBONS

Ronald H. Neill, Montclair, Richard F. Sweeney, Randolph Township, Morris County, and Cyril Woolf, Morristown, N.J., assignors to Allied Chemical Corporation, New York, N.Y., a corporation of New York No Drawing. Filed Mar. 22, 1960, Ser. No. 16,631

5 Claims. (Cl. 260—653.8)

This invention relates to production of more highly fluorinated propanes from 1,1,1,2,3,3,3-heptafluoropropane, $CF_3CFHCF_3$, B.P. minus 17–18.5° C., and more particularly to production of perfluoropropane, $$CF_3CF_2CF_3$$

B.P. minus 38° C., and 1,1,1,3,3,3-hexafluoro-2-trifluoromethylpropane, $CF_3CH(CF_3)CF_3$, B.P. plus 11–12° C., from the 2-monohydroheptafluoropropane, referred to herein mostly as heptafluoropropane.

Highly fluorinated alkanes are markedly stable thermally. As a rule, temperatures appreciably above 700° C. are required to effect any decomposition of a perfluorocarbon or a monohydroperfluorocarbon. Regarding the $CF_3CFHCF_3$ starting material of the present invention, it would be expected that very high temperatures would be required to effect any decomposition, and it would be expected also that fragmentation would result yielding compounds containing one or 2 carbon atoms such as fluoroform and carbon tetrafluoride.

A major object of the present invention is to provide a relatively simple method for making more highly fluorinated propanes from $CF_3CFHCF_3$.

In accordance with the invention, it has been found that activated carbon not only effects pyrolytic transformation of heptafluoropropane to more highly fluorinated propanes but also facilitates use of economically feasible reaction temperatures substantially lower than the prior art would indicate. It has been found also that the activated carbon and temperatures employed do not cause any substantial fragmentation or degradation to lower carbon content products, but to the contrary effect formation of materials of greater carbon chain lengths.

The activated carbon catalysts which may be used in practice of the invention are granular materials readily available from several commercial sources, suitable materials being various grades of around 8–14 mesh activated carbon such as Columbia 6G, Columbia SW, and Darco. Granular size of the activated carbon is not highly critical. Ordinarily, reaction is carried out in elongated tubular reactors, and in these instances it is desirable to employ activated carbon granules of average mesh size between 1/20 and 1/4 of the reactor diameter, and better conditions are those in which a reactor is substantially completely filled with granules of average mesh of about 1/8 or 1/10 of the diameter dimension of the reactor.

Generally, practice of the invention process for making more highly fluorinated propanes from $CF_3CFHCF_3$ comprises pyrolyzing the heptafluoropropane starting material at moderately elevated reaction temperatures while in the presence of catalysts preferably consisting of activated carbon, and recovering the more highly fluorinated propane from the resulting reaction product. More particularly, gaseous starting material preferably consisting of gaseous heptafluoropropane is continuously metered or otherwise fed into a tubular reactor packed preferably full with activated carbon catalysts and which may be made of inert material such as nickel, Monel or Inconel, and enveloped in a suitable tubular electric furnace provided with automatic heating means for reaction zone temperature maintenance. Product recovery may be effected more or less conventionally as in this art. For example, reaction zone exit may be passed thru a water scrubber to remove HF, the exit of the scrubber may be dried as by $CaCl_2$, and then totally condensed in a receiver or trap by suitable cooling, such as by use of a Dry Ice-acetone mixture. The resulting condensate then may be fractionally distilled in suitable equipment to facilitate recovery of sought-for products.

In accordance with the invention, it has been found that pyrolytic transformation of heptafluoropropane significantly takes hold, in the presence of activated carbon, at temperature of about 475° C. Preferred low temperature for commercially acceptable yields is about 500° C. Temperatures as high as about 700° C. may be utilized without interfering with yields, and appreciably higher temperatures are undesirable in order to avoid appreciable fragmentation and degradation to products of lower carbon atom content. Operating temperatures higher than about 600° C. appear to afford no significant operating advantages. Hence, preferred temperatures lie substantially in the range of 500–600° C.

Contact time may be varied considerably without noticeable disadvantage to process efficiency. Increasing contact time and reactor temperature result in higher conversion of starting material to sought-for products, and lower contact time and reactor temperature result in lower conversion. In general, contact time may lie in the range of 1 to 200 seconds, although experience shows that better results are obtained when contact time is in the range of 5 to 40 seconds. For any given operation, optimum correlation of temperature and contact time may be determined by test runs.

Reactions described are ordinarily carried out at substantially atmospheric pressure. Usually in large-scale operation, plus pressure of, e.g., 2–10 p.s.i.g. is used to maintain the gas flow thru the reactor and products recovery system. However, sub- or superatmospheric pressures may be employed, and in some instances increased pressure may yield more products of higher carbon content.

In practice, material discharged from the reactor is passed thru a water scrubber to remove HF, and the scrubbed exit after drying is totally condensed in the refrigerated trap. The major weight proportion of the organic condensate therein comprises perfluoropropane and 2-trifluoromethyl-2-hydrohexafluoropropane, preferred sought-for products of the invention process. The perfluoropropane is a commercial product of utility as a gaseous dielectric and as a low temperature heat transfer medium. The $CF_3CH(CF_3)CF_3$ product is useful as an aerosol propellant, refrigerant and as an intermediate for conversion to the olefinic monomer $(CF_3)_2C:CF_2$. In addition to the major sought-for products, the condensate in the cold trap contains a minor weight proportion of materials boiling above about 20° C. These materials probably comprise mostly five carbon atom olefinic material together with some material containing more than five carbon atoms.

The following examples illustrate practice of the invention. The reactor employed consisted of a 1″ I.D. nickel pipe about 36″ long and enclosed in an electrical heating unit. The catalyst was activated carbon Columbia 6G in the form of granules sized roughly to about 1/10 of the reactor diameter. The reactor was completely filled with catalyst and the charge amounted to approximately 0.45 liter. Pressure in the reactor system was about 2 lbs./sq. in. gauge, i.e., sufficient to move the gas stream thru the reactor system. The reactor was followed by a water scrubber to remove any HF, a $CaCl_2$ drying tower, and a refrigerated trap cooled to about minus 78° C. by a Dry Ice-acetone mixture.

*Example I.*—During a period of 2.5 hours, about 450 grams (2.65 M) of 2-monohydroheptafluoropropane, $CF_3CFHCF_3$ 99 plus percent pure, was metered in vapor form into the reactor. Internal temperature in the reactor was held at about 545° C., and overall contact time was approximately 23 sec. Materials exiting the reactor were water-scrubbed, dried, and condensed in the trap. A total of 24.6 g. (1.23 M) of HF was removed from the exit gas by the water scrubber, and a total of 405.0 gms. of condensate was recovered in the trap. Upon fractional distillation the following materials were isolated: 77.0 g. (0.41 M) of octafluoropropane, $$CF_3CF_2CF_3$$

B.P. minus 38° C.; 6.0 gms. (0.04 M) of hexafluoropropene, $CF_3CF:CF_2$, B.P. minus 31° C.; 121 gms. (0.72 M) of 2-monohydroheptafluoropropane (starting material) B.P. minus 17–18.5° C.; 116 gms. (0.53 M) of 2-trifluoromethyl-2-hydrohexafluoropropane, B.P. plus 10–13° C.; and 81 gms. of unidentified material boiling above 20° C. The percent conversion of the $C_3F_7H$ starting material to $CF_3CF_2CF_3$ and $CF_3CH(CF_3)CF_3$ was 16.6% and 26.7% respectively. Percent conversion equals mols of starting material consumed divided by mols of starting material fed multiplied by 100. The percent yield of $C_3F_8$ and $C_4F_9H$, based on total starting material reacted, was 21% and 37% respectively. The bulk of the remaining product was probably $C_5$ olefins, with some perfluorocarbon olefin material of higher carbon content and boiling point. Since about 329 g. $C_3F_7H$ starting material reacted, and about 25 g. of HF were eliminated, theory weight of organic products would be about 304 g. About 280 g. of organic products were obtained, which value represents a recovery of 93% of expected. About 27% by weight of total recovered products was sought-for $CF_3CF_2CF_3$, and about 42% by weight was sought-for $CF_3CH(CF_3)CF_3$.

*Example II.*—During a period of 1.75 hrs., about 490 grams (2.88 M) of the same $CF_3CFHCF_3$ starting material of Example 1 was metered into the reactor held at internal temperature of about 541° C. The overall contact time was about 15–16 seconds. The reactor exit was handled as before. A total of 17.2 g. (0.86 M) of HF was scrubbed from the reactor exit gas, and about 464 grams of condensate were recovered in the trap. On fractional distillation the following materials were isolated: 35 grams (0.19 M) of perfluoropropane; 296 grams (1.74 M) of monohydroheptafluoropropane starting material; 52 grams (0.23 M) of $CF_3CH(CF_3)CF_3$; and 67 grams of higher boiling material of the same composition as in Example 1. Conversion of $C_3F_7H$ starting material to $C_3F_8$ and $C_4F_9H$ was 6.6% and 10.7% respectively, and yield of $C_3F_8$ and $C_4F_9H$ was 16.7% and 27% respectively. Weight recovery of products was about 87% of expected, and the organic products contained by weight about 23% sought-for $C_3F_8$, and about 34% sought-for $C_4F_9H$.

We claim:
1. The process for making a more highly fluorinated propane from $CF_3CFHCF_3$ which comprises heating $CF_3CFHCF_3$ starting material at temperature substantially in the range of 475–700° C. and while in the presence of activated carbon catalyst, and recovering a more highly fluorinated propane from the resulting reaction product.
2. The process for making $CF_3CF_2CF_3$ and

$$CF_3CH(CF_3)CF_3$$

which comprises heating $CF_3CFHCF_3$ starting material at temperature substantially in the range of 475–700° C. and while in the presence of activated carbon catalyst, and recovering $CF_3CF_2CF_3$ and $CF_3CH(CF_3)CF_3$ from the resulting reaction product.
3. The process for making $CF_3CF_2CF_3$ and $$CF_3CH(CF_3)CF_3$$

which comprises continuously introducing gaseous $CF_3CFHCF_3$ starting material into a reaction zone, heating said starting material in said zone at temperatures substantially in the range of 475–700° C. and while in the presence of activated carbon catalyst, continuously discharging from the reaction zone material comprising $CF_3CF_2CF_3$ and $CF_3CH(CF_3)CF_3$, and recovering $CF_3CF_2CF_3$ and $CF_3CH(CF_3)CF_3$ from said material.
4. The process of claim 3 in which temperature lies substantially in the range of 500–600° C.
5. The process of claim 3 in which temperature lies substantially in the range of 500–600° C., and contact time lies substantially in the range of 5–40 seconds.

No references cited.